United States Patent
Chandangoudar (10) Patent No.: US 9,960,954 B2
(45) Date of Patent: May 1, 2018

(54) METHODS AND SYSTEMS TO IMPROVE CORRELATION BETWEEN OVERLAY AND UNDERLAY NETWORKS IN DATA CENTERS

(71) Applicant: Wipro Limited, Bangalore (IN)

(72) Inventor: Girish Chandangoudar, Bengaluru (IN)

(73) Assignee: Wipro Limited, Bangalore (IN)

( * ) Notice: Subject to any disclaimer, the term of this patent is extended or adjusted under 35 U.S.C. 154(b) by 121 days.

(21) Appl. No.: 15/085,600

(22) Filed: Mar. 30, 2016

(65) Prior Publication Data
US 2017/0288945 A1    Oct. 5, 2017

(30) Foreign Application Priority Data
Mar. 29, 2016 (IN) .............................. 201641010852

(51) Int. Cl.
*H04L 1/00* (2006.01)
*H04L 12/24* (2006.01)
*H04L 12/26* (2006.01)

(52) U.S. Cl.
CPC ...... *H04L 41/0654* (2013.01); *H04L 41/0631* (2013.01); *H04L 41/0816* (2013.01); *H04L 41/0859* (2013.01); *H04L 41/147* (2013.01); *H04L 43/045* (2013.01); *H04L 43/10* (2013.01)

(58) Field of Classification Search
CPC ............. H04L 41/0654; H04L 41/0816; H04L 41/0859
See application file for complete search history.

(56) References Cited

U.S. PATENT DOCUMENTS

| | | | | |
|---|---|---|---|---|
| 8,208,381 B2 * | 6/2012 | Kannan | ............... | G06F 11/0712 370/241 |
| 8,699,355 B2 * | 4/2014 | Macias | ............... | H04L 12/2697 370/242 |
| 2002/0174207 A1 * | 11/2002 | Battou | .................. | G06F 9/4411 709/221 |
| 2014/0092907 A1 | 4/2014 | Sridhar et al. | | |
| 2017/0126477 A1 * | 5/2017 | Ponnuswamy | ..... | H04L 41/0654 |

OTHER PUBLICATIONS

Ando et al., "Network Virtualization for Large-Scale Data Centers," Fujitsu Sco. Tech. J. 49(3):292-299 (2013).

(Continued)

*Primary Examiner* — Abdelnabi O Musa
(74) *Attorney, Agent, or Firm* — LeClairRyan PLLC (57) ABSTRACT

This disclosure relates generally to data centers and more particularly to methods and systems for improving correlation between overlay networks and underlay networks in data centers. In one embodiment, the method includes obtaining control information from a first network and control information of a second network of the plurality of networks, and correlating the control information of the first network and the second network to generate a relationship matrix. The method further includes determining one or more issues in the first network and the second network in response to generating of the relationship matrix, and performing one or more corrective actions to resolve the one or more issues in one or more of the first network and the second network.

17 Claims, 8 Drawing Sheets

(56) References Cited

OTHER PUBLICATIONS

Tang et al., "Probabilistic and Reactive Fault Diagnosis for Dynamic Overlay Networks," Peer-to-Peer Netw. Appl. 4:439-452 (2011).

Tang et al., "Efficient Fault Diagnosis Using Incremental Alarm Correlation and Active Investigation for Internet and Overlay Networks," IEEE Transactions on Network and Service Management 5(1):36-49 (2008.

"Cloud Analytics Engine," Juniper Networks Data Sheet (2015).

Aggarwal et al., "Modelling Overlay-Underlay Correlations Using Visualization," Telektronikk 1 114-125 (2008).

Stiliadis, Dimitri, "It's Overlay O'Clock! Do You Know Where Your Packets Are?" Nuage Networks, www.nuagenetworks.net/blog/its-overlay-oclock-do-you-know-where-your-packets-are (May 13, 2015).

* cited by examiner

METHODS AND SYSTEMS TO IMPROVE CORRELATION BETWEEN OVERLAY AND UNDERLAY NETWORKS IN DATA CENTERS

This application claims the benefit of Indian Patent Application Serial No. 201641010852, filed Mar. 29, 2016, which is hereby incorporated by reference in its entirety.

FIELD

This disclosure relates generally to data centers and more particularly to methods and systems for improving correlation between overlay networks and underlay networks in data centers.

BACKGROUND

In a data center environment, an overlay network may be built on top of an underlay network. Nodes within the overlay network may be connected via virtual and/or logical links that may correspond to nodes and physical links in the underlay network. Typically, these overlay networks and underlay networks are created, managed and organized using tools from different vendors. As a result, a lot of inconvenience is caused during troubleshooting, managing work assignments, and scheduling repairing issues in the data center environment. Moreover, the Mean-Time-To-Repair (MTTR) increases resulting in performance degradation of the data center environment.

Technological advances that allow increased coordination or correlation between the overlay networks and the underlay networks or that simplify management and improve performance are desirable.

SUMMARY

In one embodiment, method of managing a plurality of networks by a network management system is disclosed. The method includes obtaining, by the network management system, control information from a first network of the plurality of networks, wherein the control information comprises data transmission information in the first network, and network resource information in the first network; obtaining, by the network management system, control information from a second network of the plurality of networks, wherein the control information comprises data transmission information in the second network, and network resource information in the second network; correlating, by the network management system, the control information of the first network and the control information of the second network to generate a relationship matrix; determining, by the network management system, at least one issue in at least one of the first network and the second network in response to generating the relationship matrix; and performing, by the network management system, at least one corrective action to resolve the at least one issue in the at least one of the first network and the second network.

In another embodiment, a network management system to manage a plurality of networks is disclosed. The system includes a database, wherein the database comprises a historical database, and a solutions database; and a processor, the processor being operatively coupled to the database, the processor configured to: obtain control information from a first network of the plurality of networks, wherein the control information comprises data transmission information in the first network, and network resource information in the first network; obtain control information from a second network of the plurality of networks, wherein the control information comprises data transmission information in the second network, and network resource information in the second network; correlate the control information of the first network and the control information of the second network to generate a relationship matrix; determine at least one issue in at least one of the first network and the second network in response to generation of the relationship matrix; and perform at least one corrective action to resolve the at least one issue in the at least one of the first network and the second network.

In yet another embodiment, a non-transitory computer-readable storage medium for managing a plurality of networks is disclosed, which when executed by a computing device, cause the computing device to obtain control information from a first network of the plurality of networks, wherein the control information comprises data transmission information in the first network, and network resource information in the first network; obtain control information from a second network of the plurality of networks, wherein the control information comprises data transmission information in the second network, and network resource information in the second network; correlate the control information of the first network and the control information of the second network to generate a relationship matrix; determine one or more issues in one or more of the first network and the second network in response to generating of the relationship matrix; perform one or more corrective actions to resolve the one or more issues in the one or more of the first network and the second network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments provide methods and systems for managing a plurality of networks in a data center. Specifically, the method improves the correlation between an underlay network and an overlay network of the plurality of networks. The method includes obtaining control information from a first network and obtaining control information of a second network of the plurality of networks. Example of the first network includes an underlay network and example of the second network includes an overlay network. The method correlates the control information of the first network and the control information of the second network to generate a relationship matrix. The method further includes determining one or more issues in one or more of the first network and the second network in response to generating the relationship matrix. The method further includes performing one or more corrective actions to resolve the one or more issues in one or more of the first network and the second network.

Figure 1:
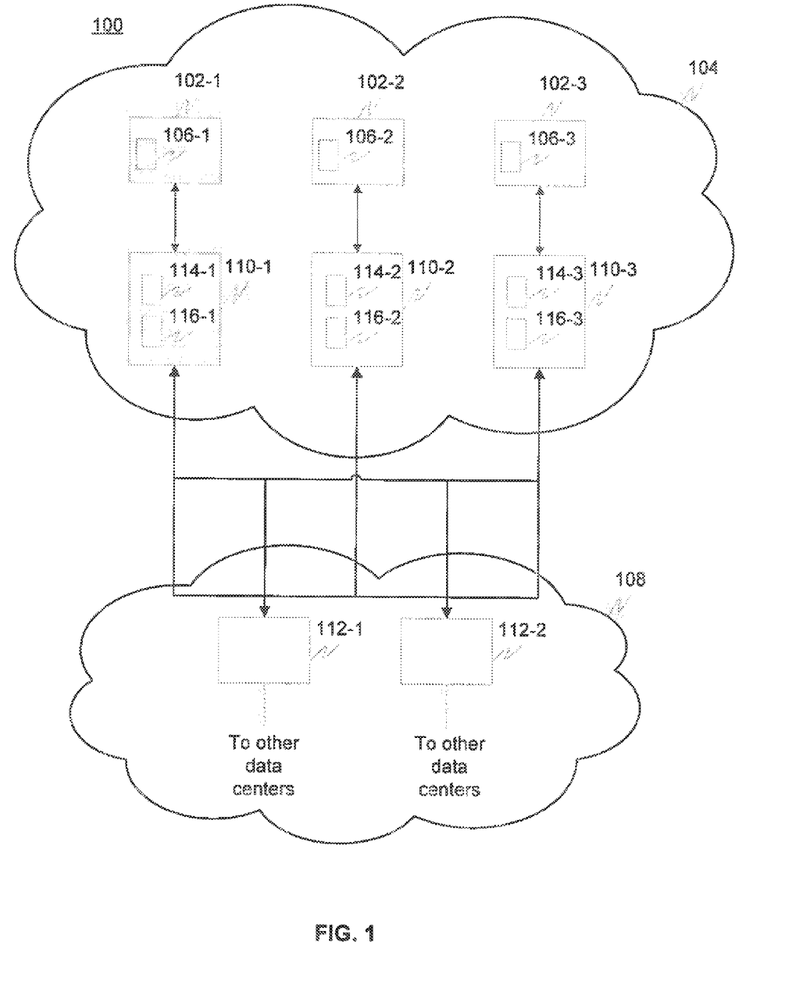
FIG. 1 is a block diagram of a data center environment (that is exemplary) in which various embodiments of the present inventive concepts can be employed.

FIG. 1 is a block diagram of a data center environment 100 in which embodiments of the present inventive concepts can be employed. The equipment of the data center environment 100 can reside together locally at a single site or can be distributed over two or more separate sites. The data center environment 100 can include one or more host computers 102-n, such as host computer 102-1, host computer 102-2, host computer 102-3 and so on, connected with each other to form an underlay network 104. Each of the one or more host computers 102-n can be an embodiment of a physical computing device, such as a server or a blade. Further, each of the one or more host computers 102-n can reside alone or be installed in a chassis with other host computers, for example, as in a rack server or in a blade server.

Communication amongst physical components, such as memory, and CPU (not shown in FIG. 1) of the one or more host computer 102-n as well as communication amongst the one or more host computers 102-n in the underlay network 104 is achieved through one or more busses, connectors, adaptors, and the like known to those of ordinary skill in the art. The underlay network 104 is also referred to as physical network.

Each host computer of the one or more host computers 102-n can run a virtualization system 106-n, which can optionally include a hypervisor or a Virtual Machine Manager (VMM). For example, the host computer 102-1 runs virtualization system 106-1, host computer 102-2 runs virtualization system 106-2, and host computer 102-3 runs virtualization system 106-3 and so on. In an embodiment, the one or more host computers 102-n may be a non-virtualized server or a server blade.

An overlay network 108 may be built on top of the underlay network 104. The term 'overlay network' means a network structured on an underlying network and using the underlying network's data transmission function, but having a routing function differing from that of the underlying network. Thus, nodes within the overlay network 108 may be connected via virtual and/or logical links that may correspond to nodes and physical links in the underlay network 104. The overlay network 108 may be partitioned into virtual network instances (not shown in FIG. 1) that may simultaneously execute different applications and services using the underlay network 104. Further, virtual resources, such as computational, storage, and/or network elements may be flexibly redistributed or moved throughout the overlay network 108. The overlay network 108 is essentially formed by establishing tunnels between servers, edge network switches, and gateways in the data center environment to which a plurality of end stations are connected.

Each host computer of the one or more host computers 102-n is connected to the overlay network 108 through one more access switches 110-n. For example, as shown in FIG. 1, host computer 102-1 is connected to the overlay network 108 through an access switch 110-1, host computer 102-2 is connected to the overlay network 108 through an access switch 110-2, and host computer 102-3 is connected to the overlay network 108 through an access switch 110-3. Each of the one or more access switches 110-n can reside alone or be installed within the same chassis as the one or more host computers 102-n.

The data center environment 100 may also include one or more routers 112-n interposed between the one or more access switches 110-n and the overlay network 108. For example, the router 112-1 is interposed between the access switch 110-1, the access switch 110-2 and the overlay network 108. In the same manner, the router 112-2 is interposed between the access switch 110-2, the access switch 110-3 and the overlay network 108. The one or more routers 112-n may provide a gateway to connect to another data center environment (not shown in FIG. 1). Each of the one more access switches 110-n may be configured with a management module 114-n for performing intra-hypervisor VM-to-VM switching and the like. Further, each of the one or more access switches 110-n may include an overlay agent 116-n configured to perform a virtual network overlay operation.

Figure 2:
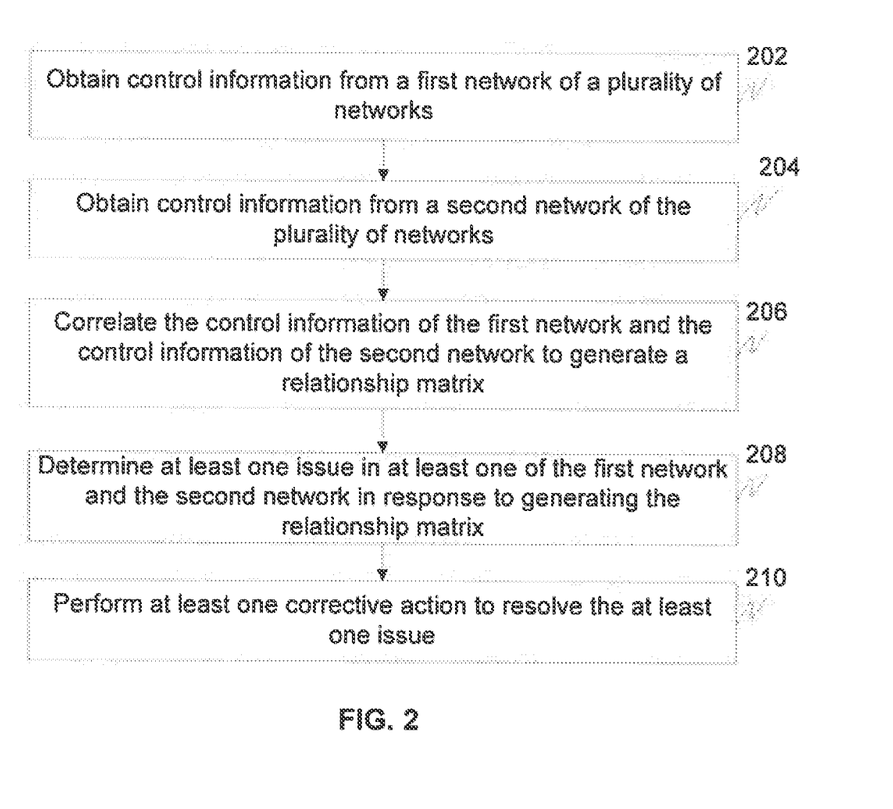
FIG. 2 is a flowchart of a method for managing a plurality of networks by a network management system in a data center, in accordance with an embodiment.

FIG. 2 is a flowchart of a method for managing a plurality of networks by a network management system in a data center, in accordance with an embodiment. The network management system is described in detail with reference to FIG. 7. Examples of the plurality of networks may include, but are not limited to an underlay network and an overlay network. At 202, the network management system obtains control information from a first network of the plurality of networks. The control information from the first network includes data transmission information of the first network and network resource information of the first network. The data transmission information associated with the first network includes its routing information, traffic flow information, and network flow information. The network resource information of the first network includes, but is not limited to network topology information, network components information such as links and nodes, and network performance information.

After obtaining the control information from the first network, the network management system obtains control information from a second network of the plurality of the networks at 204. The control information from the second network includes data transmission information of the second network and network resource information of the second network. The data transmission information associated with the second network includes its routing information, traffic flow information, and network flow information. The network resource information of the second network includes, but is not limited to its network topology information, network components information such as links and nodes, and network performance information.

The control information associated with each of the first network and the second network may be obtained through active probing or through passive probing of the data center infrastructure. Examples of the passive probing techniques utilized by the network management system to obtain the control information may include, but are not limited to Remote Monitoring (RMON), Simple Network Monitoring Protocol (SNMP), Events & Error Logs, Flow Data, Command Line Interface (CLI), and Application Program Interfaces (APIs). In an embodiment, the network management system may employ a combination of active probing and passive probing to obtain the control information.

Thereafter, at 206, the network management system correlates the control information of the first network and the control information of the second network to generate a relationship matrix. In order to generate the relationship matrix, the network management system detects events occurring in the first network and corresponding events occurring in the second network for identifying relationship between the events. For example, the network management system may detect events in the underlay network at a specific time and corresponding events occurring in the overlay network at the specified time for identifying relationship between the events of the underlay network and the overlay network. In the same manner, the network management system may detect events occurring in the overlay network when there is traffic moving across the underlay network. In an embodiment, one or more algorithms may be employed by the network management system to learn how changes and demands in one network affect another network. For example, the one or more algorithms may be employed to learn how the underlay network responds to changes and demands of the overlay network. By way of an example, an algorithm may utilize network flow data in real-time to correlate a link or node failure or a performance threshold breach in the underlay network to overlay network flows across that link or node. By way of another example, an algorithm may map network flow data and network forwarding information base data gathered by the network management system, to correlate overlay network performance degradation to a set of events in the underlay network pertaining to link utilization, node or link failures and routing changes in the underlay network.

In an embodiment, the network management system may categorize the control information before generating the relationship matrix. The control information may be categorized to expedite the correlation step as well as to expedite the detection of events in the plurality of networks. The control information may be categorized as, but not limited to topological information, fault information, performance information, and network flow information. The topological information includes information associated with underlay network nodes and overlay network nodes, underlay network links, overlay network links, adjacencies between the underlay network and the overlay network, end point associations in the underlay network and the overlay network, routing table information of the underlay network and the overlay network, and forwarding table information of the underlay network and the overlay network.

At 208, the network management system determines one or more issues in response to generating the relationship matrix. The one or more issues may be determined in the first network or in the second network. For example, after generating the relationship matrix, the network management system may determine one or more issues in the underlay network. Similarly, the network management system may determine one or more issues in the overlay network as a result of generating of the relationship matrix.

After determining the one or more issues, the network management system may perform one or more corrective actions to resolve the one or more issues at 210. The one or more corrective actions are aimed to resolve the one or more issues of the first network or of the second network. For example, the network management system may perform a corrective action to resolve the one or more issues of the underlay network. In the same manner, the network management system may perform a corrective action to resolve the one or more issues of the overlay network.

The method leverages readily available and commonly deployed fault, performance and flow monitoring tools to gather data in real-time and refer to historical data. Further, the method achieves end-to-end operational visibility thereby eliminating blind spots in the underlay and the overlay network. The method also improves the overall performance of the plurality of networks in the data center. Moreover, the method does not require separate provisioning, monitoring, and management tools for the underlay and the overlay network. Also, the method provides for troubleshooting of issues in the underlay network and the overlay network in a quick and seamless manner thereby reducing the Mean-Time-To-Repair (MTTR) value.

Figure 3:
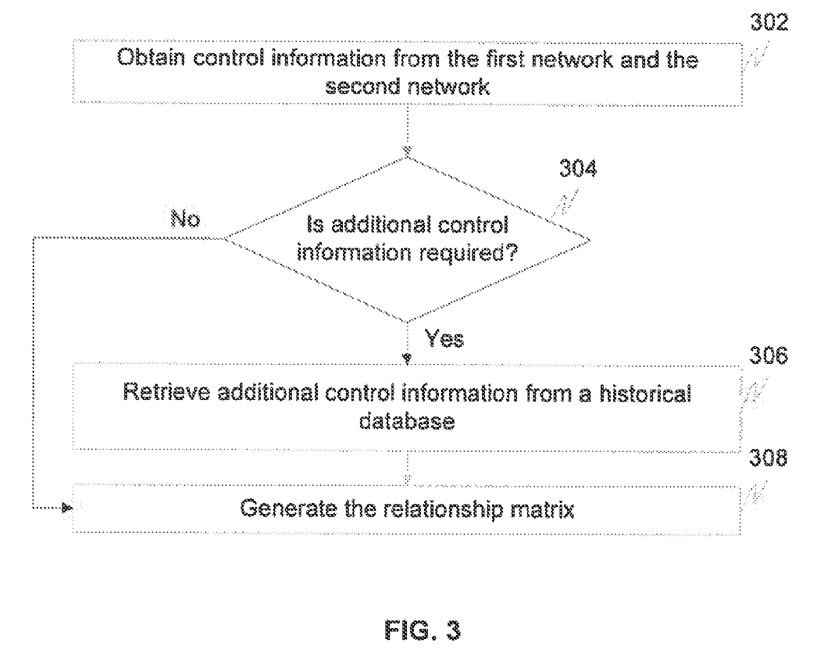
FIG. 3 is a flowchart of a method for generating a relationship matrix, in accordance with an embodiment.

FIG. 3 is a flowchart of a method for generating a relationship matrix, in accordance with an embodiment. At 302, the network management system obtains control information from the first network and the second network. Thereafter, at 304, the network management system analyzes the control information to determine whether additional control information or additional data associated with the already obtained control information is required for generating the relationship matrix.

If additional control information or additional data associated with the already obtained control information is required, then the network management system retrieves the additional control information or the data associated with the already obtained control information from a historical database at 306. The historical database is a database configured to store and manage the control information and additional data associated with the control information. In an embodiment, each network of the plurality of networks may have a separate historical database.

Thereafter, at 308, the relationship matrix is generated based on the control information obtained from the first network and the second network as well as the control information obtained from the historical database. After generating the relationship matrix, the network management system transfers the control information of the first network and the control information of the second network to the historical database in order to store and manage the control information. The control information may be transferred to the historical database at fixed intervals or dynamically when certain specified conditions are met. Further, the control information may be time stamped when it is stored in the historical database.

Referring back to 304, if additional control information or additional data associated with the already obtained control information is not required, the method moves to 308. It will be evident to a person skilled in the art that the control information may be associated with one or more tags or may be processed in a manner which facilitates efficient storage of the control information in the historical database.

Figure 4:
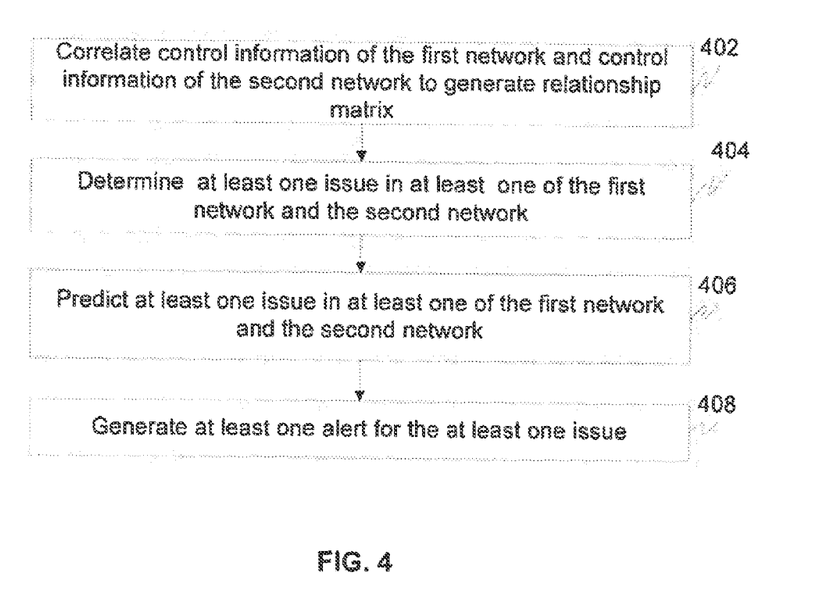
FIG. 4 is a flowchart of a method for generating alerts for issues, in accordance with an embodiment.

FIG. 4 is a flowchart of a method for generating alerts for issues, in accordance with an embodiment. At 402, the network management system correlates the control information of the first network and the control information of the second network to generate the relationship matrix. After generating the relationship matrix, at 404, the network management system determines one or more issues in one or more of the first network and the second network. In one embodiment, the network management system may be required to determine one or more issues that may occur at a later point in time. Thus, at 406, the network management system may predict one or more issues that may occur in one or more of the first network and the second network at a later point in time. The network management system may also provide additional details such as time when the one or more issues may occur, a predictability score for the one or more issues that provides a probability of the one or more issues to occur in the future.

Based on the one or more issues that are determined at 404 and the one or more issues that are predicted at 406, the network management system generates one or more alerts at 408. The one or more alerts are generated to notify a user of the network management system regarding the one or more issues that are determined or to notify the user of the one or more issues that are predicted to occur at a later point in time. Thus, the one or more alerts may notify the user in advance regarding issues that may occur when a network is not capable or acceptable to the demands of another network. For example, the user may be notified in advance that the underlay network is not capable or acceptable to the demands of the overlay network at a later point in time and vice versa. The one or more alerts may be delivered to the user through a notification that may include, but is not limited to a prompt on a user interface, an SMS, an email, and an alarm.

Figure 5:
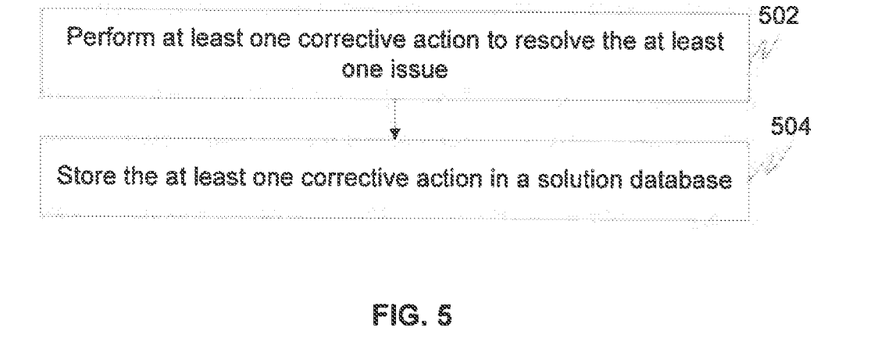
FIG. 5 is a flowchart of a method for storing corrective actions in a solutions database, in accordance with an embodiment.

FIG. 5 is a flowchart of a method for storing corrective actions in a solutions database, in accordance with an embodiment. After the network management system determines one or more issues in one or more of the first network and the second network, the network management system may perform one or more corrective actions to resolve the one or more issues at 502. In an embodiment, the one or more corrective actions may be derived based on previous corrective actions executed by the network management system for same or similar issues. In another embodiment, the one or more corrective actions may be new solutions that have not been executed before by the network management system. Therefore, at 504, the one or more corrective actions for the one or more issues are stored in a solutions database. The solutions database is configured to store and manage the one or more corrective actions. Each corrective action of the one or more corrective actions may be mapped to one or more issues that the corrective actions is designed to resolve. Thus, a corrective action may have a one to one or one to many mapping in the solution database.

Figure 6:
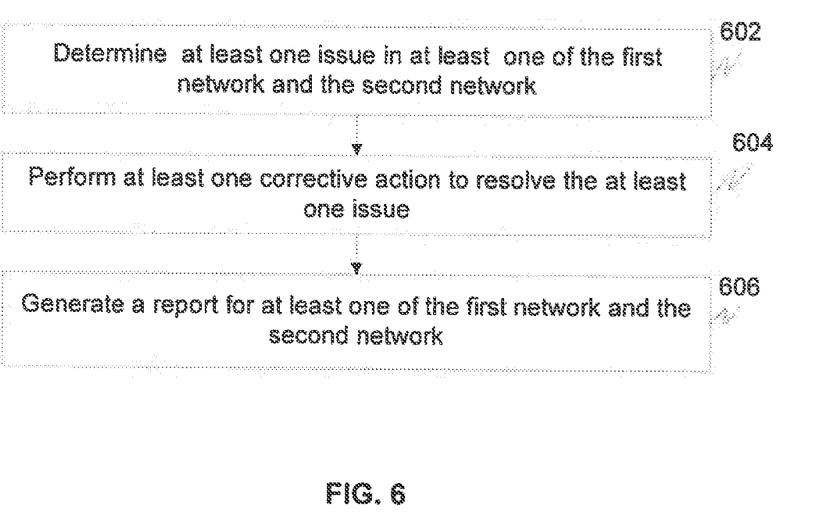
FIG. 6 is a flowchart of a method for generating a report, in accordance with an embodiment.

FIG. 6 is a flowchart of a method for generating a report, in accordance with an embodiment. At 602, the network management system may determine one or more issues in one or more of the first network and the second network of based on the relationship matrix. Thereafter, at 604, the network management system may perform one or more corrective actions to resolve the one or more issues. After performing the one or more corrective actions, the network management system may generate a report for one or more of the first network and the second network at 606.

The report may include a current path health visualization between a set of network end points, a predicted path health visualization between the set of network end points, details of the one or more determined issues in one or more of the first network and the second network, and details of the one or more corrective actions performed to resolve the one or more issues. The current path health visualization in the report provides health of network nodes and links through which traffic is currently flowing in one or more of the first network and the second network. In order to determine the current path health visualization, edges or nodes involved in sending and receiving data in a path are tracked and monitored. When the data is transferred successfully, it would indicate that the path is healthy.

Thus, real-time monitoring of paths in the plurality of networks can be achieved and current path health visualization can be created for each path in the plurality of networks. In the same manner, the predicted path health visualization in the report provides health of network nodes and links through which traffic is expected to flow in a predictive manner in one or more of the first network and the second network. The healthy paths, links, edges, and/or nodes may be represented in the report using a predefined first color coding and the unhealthy paths, links, edges, and/or nodes may be represented in the report using another predefined second color coding.

In an embodiment, the network management system may utilize the transport layer in the plurality of networks to map the delivery of data being transferred across networks. Thus, the network management system may dynamically plot the path health visualization between two end-points in the same network or between two end-points across networks by utilizing information present in the transport layer. Moreover, the network management system may combine the dynamically generated path health visualization with historical path health visualization data to benchmark the various edges and nodes as well as to plot trends or detect patterns in the traffic flow over a period of time.

Figure 7:
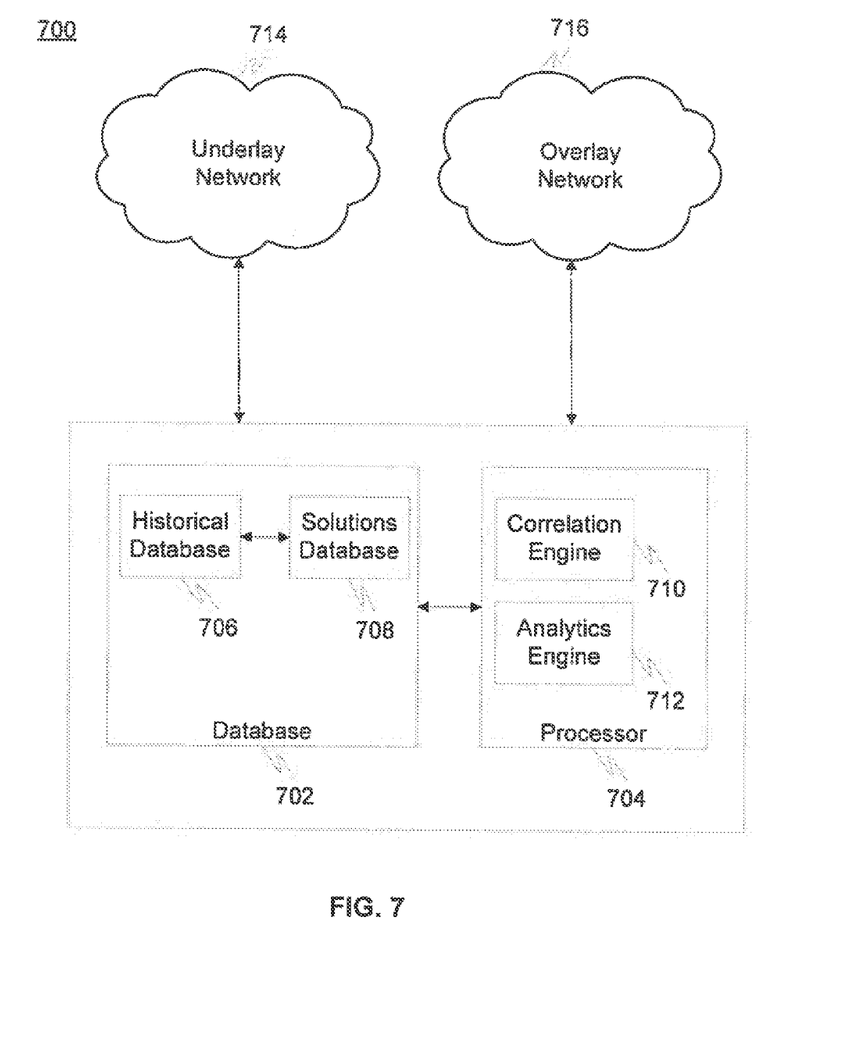
FIG. 7 is a block diagram showing a network management system configured to manage a plurality of networks, in accordance with an embodiment.

FIG. 7 is a block diagram showing a network management system 700 configured to manage a plurality of networks, in accordance with an embodiment. Network management system 700 includes a database 702 and a processor 704. Further, the database 702 includes a historical database 706 and a solutions database 708. The historical database 706 and the solutions database 708 are operatively coupled to each other as well as to the processor 704. The processor 704 includes a correlation engine 710 and an analytics engine 712. The network management system 700 can reside locally at a single site or can be distributed over two or more separate sites. Further, the network management system 700 can be part of an underlay network 714 or part of an overlay network 716. In an embodiment, the network management system 700 can be part of both the underlay network 714 and the overlay network 716.

The correlation engine 710 is configured to obtain control information from a plurality of networks. Examples of the plurality of networks may include, but are not limited to the underlay network 714 and the overlay network 716. In an embodiment, the correlation engine 710 obtains the control information from the underlay network 714. The control information obtained from the underlay network 714 includes its data transmission information and network resource information. The data transmission information associated with the underlay network 714 includes its routing information, traffic flow information, and network flow information. The network resource information includes, but is not limited to network topology information, network components information such as links and nodes, and network performance information.

After obtaining the control information from the underlay network 714, the correlation engine 710 obtains controls information from the overlay network 716. The control information from the overlay network 716 includes its data transmission information and network resource information. The data transmission information associated with the overlay network 716 includes its routing information, traffic flow information, and network flow information.

Thereafter, the correlation engine 710 correlates the control information of the underlay network 714 and the control information of the overlay network 716 to generate a relationship matrix. In order to generate the relationship matrix, the correlation engine 710 detects events occurring in the underlay network 714 and corresponding events occurring in the overlay network 716 for identifying relationship between the events. For example, the correlation engine 710 may detect events in the underlay network 714 at a specific time and corresponding events occurring in the overlay network 716 at the specified time for identifying relationship between the events of the underlay network 714 and the overlay network 716.

In an embodiment, the correlation engine 710 may analyze the control information to determine whether additional control information or additional data associated with the already obtained control information is required for generating the relationship matrix. In the event that additional control information or additional data associated with the already obtained control information is not required, then the correlation engine 710 may proceed with generating the relationship matrix. In the event that additional control information or additional data associated with the already obtained control information is required, then the correlation engine 710 may retrieve the additional control information or the data associated with the already obtained control information from the historical database 706. The historical database 706 is configured to store and manage the control information and additional data associated with the control information.

In an embodiment, the correlation engine 710 may transfer the obtained control information of the underlay network 714 and the obtained control information of the overlay network 716 to the historical database 706 in order to store and manage the control information. The control information may be transferred to the historical database 706 at fixed intervals or dynamically when certain specified conditions are met.

After generating the relationship matrix, the correlation engine 710 determines one or more issues in one or more of the underlay network 714 and the overlay network 716. For example, after generating the relationship matrix, the correlation engine 710 may determine one or more issues in the underlay network 714. Similarly, the correlation engine 710 may determine one or more issues in the overlay network 716 as a result of generating the relationship matrix.

In an embodiment, the correlation engine 710 may determine one or more issues that may occur at a later point in time in one or more of the underlay network 714 and the overlay network 716. In other words, the correlation engine 710 may predict these one or more issues. Further, the correlation engine 710 may also provide additional details such as time when the one or more issues may occur, a predictability score for the one or more issues that provides a probability of the one or more issues to occur in the future.

Thereafter, the analytics engine 712 may generate one or more alerts after receiving information about the one or more issues in one or more of the underlay network 714 and the overlay network 716. The one or more alerts are generated to notify a user of the network management system 700 regarding the one or more issues that are determined or to notify the user of the one or more issues that are predicted to occur at a later point in time. The one or more alerts may be delivered to the user through a notification that may include, but is not limited to a prompt on a user interface, an SMS, an email, and an alarm.

Thereafter, the analytics engine 712 may perform one or more corrective actions to resolve the one or more issues. The one or more corrective actions are aimed to resolve the one or more issues of the underlay network 714 or of the overlay network 716. The one or more corrective actions may be derived based on previous corrective actions executed by the analytics engine 712 for same or similar issues. In an embodiment, the one or more corrective actions may be new solutions that have not been executed before by the analytics engine 712. Therefore, in accordance with an embodiment, the analytics engine 712 may store the one or more new corrective actions in the solutions database 708. The solutions database 708 is configured to store and manage the one or more corrective actions. Each corrective action may be mapped to one or more issues that the corrective actions is designed to resolve. Thus, a corrective action may have a one to one or one to many mapping in the solution database 708.

In another embodiment, the analytics engine 712 may update the solutions database 708 with previously executed corrective actions. This may be done to increase the accuracy, performance, and speed of the network management system 700.

After performing the one or more corrective actions, the analytics engine 712 may generate a report for the plurality of networks. The report may include a current path health visualization between a set of network end points, a predicted path health visualization between the set of network end points, details of the one or more determined issues in one or more of the underlay network 714 and the overlay network 716, and details of the one or more corrective actions performed to resolve the one or more issues. The current path health visualization in the report provides health of network nodes and links through which traffic is currently flowing in one or more of the underlay network 714 and the overlay network 716. In the same manner, the predicted path health visualization in the report provides health of network nodes and links through which traffic is expected to flow in a predictive manner in one or more of the underlay network 714 and the overlay network 716.

Figure 8:
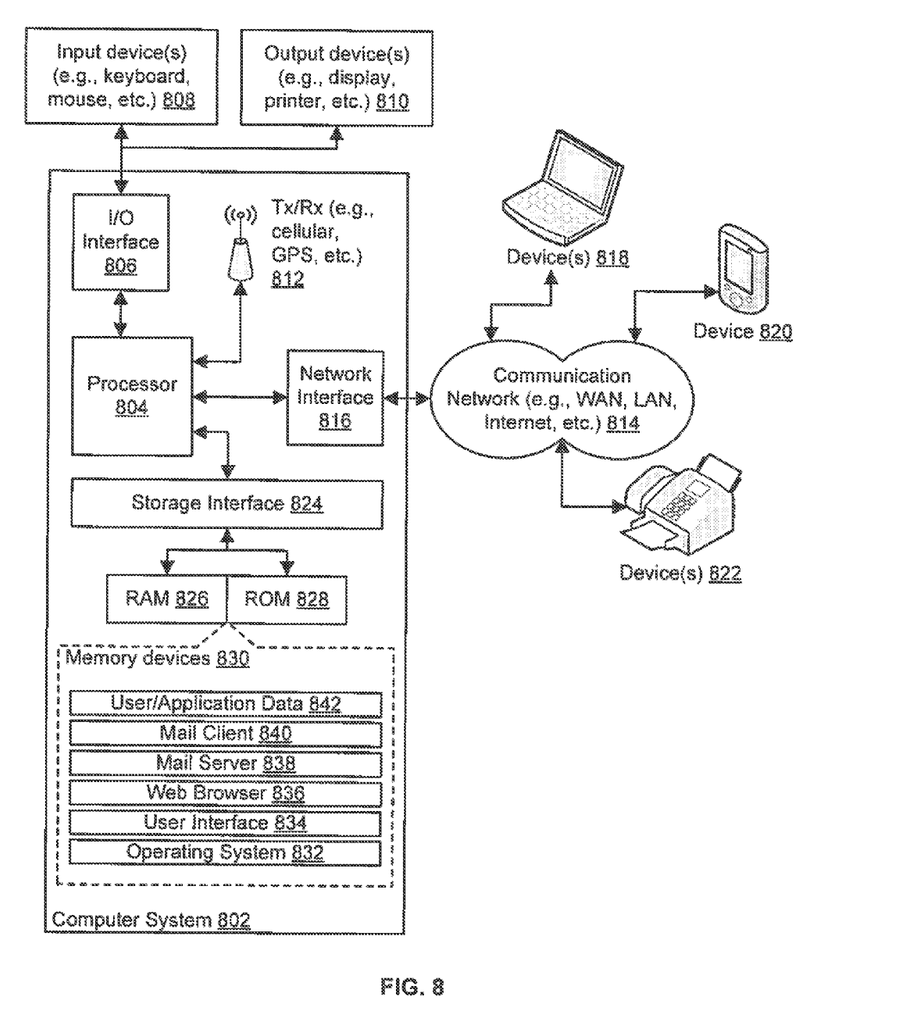
FIG. 8 is a block diagram of an exemplary computer system for implementing various embodiments.

FIG. 8 is a block diagram of an exemplary computer system for implementing various embodiments. Computer system 802 may comprise a central processing unit ("CPU" or "processor") 804. Processor 804 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface

806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (e.g., using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 802 may itself embody one or more of these devices.

In some embodiments, processor 804 may be disposed in communication with one or more memory devices (e.g., RAM 826, ROM 828, etc.) via a storage interface 824. Storage interface 824 may connect to memory devices 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 830 may store a collection of program or database components, including, without limitation, an operating system 832, a user interface application 834, a web browser 836, a mail server 838, a mail client 840, a user/application data 842 (e.g., any data variables or data records discussed in this disclosure), etc. Operating system 832 may facilitate resource management and operation of the computer system 802. Examples of operating system 832 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 802 may implement web browser 836 stored program component. Web browser 836 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 802 may implement mail server 838 stored program component. Mail server 838 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement mail client 840 stored program component. Mail client 840 may be a mail viewing application, such as Apple Mail, Microsoft Entourage, Microsoft Outlook, Mozilla Thunderbird, etc.

In some embodiments, computer system 802 may store user/application data 842, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide methods, system, and computer program products for dynamically managing a plurality of networks to improve the correlation between an underlay network and an overlay network. The method leverages readily available and commonly deployed fault, performance and flow monitoring tools to gather data in real-time and refer to historical data. Further, the method achieves end-to-end operational visibility thereby eliminating blind spots in the underlay and the overlay network. The method also improves the overall performance of the plurality of networks in the data center. Moreover, the method does not require separate provisioning, monitoring, and management tools for the underlay and the overlay network. Also, the method provides for troubleshooting of issues in the underlay network and the overlay network in a quick and seamless manner thereby reducing the mean-time-to-repair (MTTR) value.

The specification has described methods, system, and computer program products for dynamically managing a plurality of networks to improve the correlation between an underlay network and an overlay network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing a plurality of networks by a network management system, the method comprising:
   obtaining, by the network management system, control information from a first network of the plurality of networks, wherein the control information comprises data transmission information in the first network, and network resource information in the first network;
   obtaining, by the network management system, control information from a second network of the plurality of networks, wherein the control information comprises data transmission information in the second network, and network resource information in the second network;
   correlating, by the network management system, the control information of the first network and the control information of the second network to generate a relationship matrix;
   determining, by the network management system, at least one issue in at least one of the first network or the second network in response to generating the relationship matrix, wherein the determining the at least one issue further comprises predicting the at least one issue to occur at a later point in time in the at least one of the first network or the second network based on the relationship matrix; and
   performing, by the network management system, at least one corrective action to resolve the at least one issue in the at least one of the first network or the second network.

2. The method of claim 1, wherein the obtaining the control information comprises retrieving control information of the first network and control information of the second network from a historical database.

3. The method of claim 2, wherein the historical database is periodically updated to include the control information of the first network and the control information of the second network.

4. The method of claim 1, wherein the determining the at least one issue comprises generating at least one alert for the at least one issue.

5. The method of claim 1, wherein the performing the at least one corrective action comprises storing the at least one corrective action corresponding to the at least one issue in a solutions database.

6. The method of claim 1 further comprising generating a report for the plurality of networks, wherein the report comprises a current path health visualization between a set of network end points, and a predicted path health visualization between the set of network end points.

7. The method of claim 1, wherein the data transmission information comprises routing information, network flow information, and traffic flow information.

8. The method of claim 1, wherein the network resource information comprises network topology information, network components information such as links and nodes and performance information.

9. A network management system to manage a plurality of networks, the system comprising:
   a database; wherein the database comprises a historical database, and a solutions database; and a processor, the processor operatively coupled to the database, the processor configured to:
- obtain control information from a first network of the plurality of networks, wherein the control information comprises data transmission information in the first network, and network resource information in the first network;
- obtain control information from a second network of the plurality of networks, wherein the control information comprises data transmission information in the second network, and network resource information in the second network;
- correlate the control information of the first network and the control information of the second network to generate a relationship matrix;
- determine at least one issue in at least one of the first network or the second network in response to generation of the relationship matrix, wherein the determine the at least one issue further comprises predict the at least one issue to occur at a later point in time in the at least one of the first network or the second network based on the relationship matrix; and
- perform at least one corrective action to resolve the at least one issue in the at least one of the first network or the second network.

10. The network management system of claim 9, wherein the processor is further configured to retrieve control information of the first network and control information of the second network from the historical database.

11. The network management system of claim 9, wherein the processor is further configured to periodically update the historical database to include the control information of the first network and the control information of the second network.

12. The network management system of claim 9, wherein the processor is further configured to generate at least one alert for the at least one issue.

13. The network management system of claim 9, wherein the processor is further configured to store the at least one corrective action corresponding to the at least one issue in a solutions database.

14. The network management system of claim 9, wherein the processor is further configured to generate a report for the plurality of networks, wherein the report comprises a current path health visualization between a set of network end points, and a predicted path health visualization between the set of network end points.

15. The network management system of claim 9, wherein the data transmission information comprises routing information, network flow information, and traffic flow information.

16. The network management system of claim 9, wherein the network resource information comprises network topology information, network components information such as links and nodes, and performance information.

17. A non-transitory computer-readable storage medium for perform a method for managing a plurality of networks, when executed by a computing device, cause the computing device to:
- obtaining control information from a first network of the plurality of networks, wherein the control information comprises data transmission information in the first network, and network resource information in the first network;
- obtaining control information from a second network of the plurality of networks, wherein the control information comprises data transmission information in the second network, and network resource information in the second network;
- correlating the control information of the first network and the control information of the second network to generate a relationship matrix;
- determining at least one issue in at least one of the first network or the second network in response to generating of the relationship matrix, wherein the determining the at least one issue further comprises predicting the at least one issue to occur at a later point in time in the at least one of the first network or the second network based on the relationship matrix; and
- performing at least one corrective action to resolve the at least one issue in the at least one of the first network or the second network.

* * * * *